US009504339B1

(12) United States Patent
Carr et al.

(10) Patent No.: US 9,504,339 B1
(45) Date of Patent: Nov. 29, 2016

(54) HANGER, SYSTEM AND METHOD

(71) Applicants: Curtis L. Carr, Beaumont, TX (US);
Kenneth Carr, Beaumont, TX (US)

(72) Inventors: Curtis L. Carr, Beaumont, TX (US);
Kenneth Carr, Beaumont, TX (US)

( * ) Notice: Subject to any disclaimer, the term of this patent is extended or adjusted under 35 U.S.C. 154(b) by 0 days.

(21) Appl. No.: 14/933,831

(22) Filed: Nov. 5, 2015

(51) Int. Cl.
F16M 13/02 (2006.01)
A47G 1/16 (2006.01)
E04G 5/00 (2006.01)
E04G 5/06 (2006.01)

(52) U.S. Cl.
CPC ............ A47G 1/164 (2013.01); F16M 13/022 (2013.01); A47G 1/16 (2013.01); E04G 5/06 (2013.01); F16M 13/02 (2013.01)

(58) Field of Classification Search
CPC ..... A47G 1/16; A47B 96/061; A47B 96/067
USPC ......... 248/215, 304, 227.1, 220.1, 214, 247, 248/248, 250, 301, 235, 243, 340, 298.1, 248/475.1, 489.1; 211/87.01, 106.1
See application file for complete search history.

(56) References Cited

U.S. PATENT DOCUMENTS

| 624,723 A * | 5/1899 | Allis ................... A47B 96/061 248/248 |
| 2,429,586 A * | 10/1947 | Rompre .............. A47B 96/061 248/248 |
| 3,041,033 A * | 6/1962 | Schwartz ............ A47B 96/061 248/248 |
| 3,406,936 A * | 10/1968 | Dirks ..................... A47K 3/001 248/295.11 |
| 3,970,277 A * | 7/1976 | Riblet ....................... E04G 5/06 182/136 |
| 5,257,766 A * | 11/1993 | Riblet .................... B21D 53/74 108/108 |
| 5,259,477 A * | 11/1993 | Fears ....................... E04G 5/06 182/113 |
| 7,207,088 B2 * | 4/2007 | Adams .............. A47G 25/0614 16/404 |
| 7,523,894 B1 * | 4/2009 | Eddy ................... E04D 13/0725 248/216.1 |

* cited by examiner

Primary Examiner — Tan Le
(74) Attorney, Agent, or Firm — Jeffrey D. Hunt

(57) ABSTRACT

A hanger system may include a hanger bracket arm and a hanger bracket leg in fixed relationship. The hanger bracket arm and hanger bracket leg each include a front surface and a rear surface. The hanger bracket arm and the hanger bracket leg may be formed as a single unit. At least a portion of the rear surface of the hanger bracket arm may be coextensive with at least a portion of the rear surface of the hanger bracket leg. The hanger bracket arm upper edge may comprise a first stop at a distal end and a second stop at a proximal end. At least a portion of the front surface of the hanger bracket arm may be coextensive with at least a portion of the front surface of the hanger bracket leg.

6 Claims, 15 Drawing Sheets

HANGER, SYSTEM AND METHOD

FIELD OF THE INVENTION

The present disclosure relates to a hanger, system and method.

BACKGROUND OF THE INVENTION

Existing approaches for fixing photo frame, art, etc. to walls both interior and exterior is typically limited to the use of nails, and/or screws being drilled or affixed into sheetrock.

The use of this approach and the relatively brittleness of sheetrock means that this may provide a dubious fixing that is prone to failure. Furthermore, failing of the connection, in addition to the displacement and damage of the object, can also cause damage to the wall.

A common approach to reducing the likelihood of failure is to utilize wall studs. However, studs can be difficult to locate in the desired location and may lead to compromising the position of the object.

BRIEF SUMMARY OF THE INVENTION

This new picture hanging system may allow the same stud to be used for hanging with the sturdy bracket extending the reach over to the desired location. This system may transfer the load of the hung item from the location on the sheetrock back to the stud with a solid and secure mount. The weight may be placed on the wall stud and minimal amount of weight is on the sheetrock. Lastly, the sliding hook may allow for the hung item to be moved and easily positioned in a desired spot.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

The present disclosure provides for a system and method for the affixation of an object 40 to a wall 50. An object, as defined herein, includes all items that may be affixed to a wall 50 either for interior decoration purposes, e.g. artwork, pictures, etc. as well as items that may be affixed to a wall 50 for an intended purpose, e.g. chairs.

Embodiments of the present disclosure may vary in size and configuration. Configurations may include T-Shape, Right-Angle Triangle, L-Shape, etc.

Figure 1:
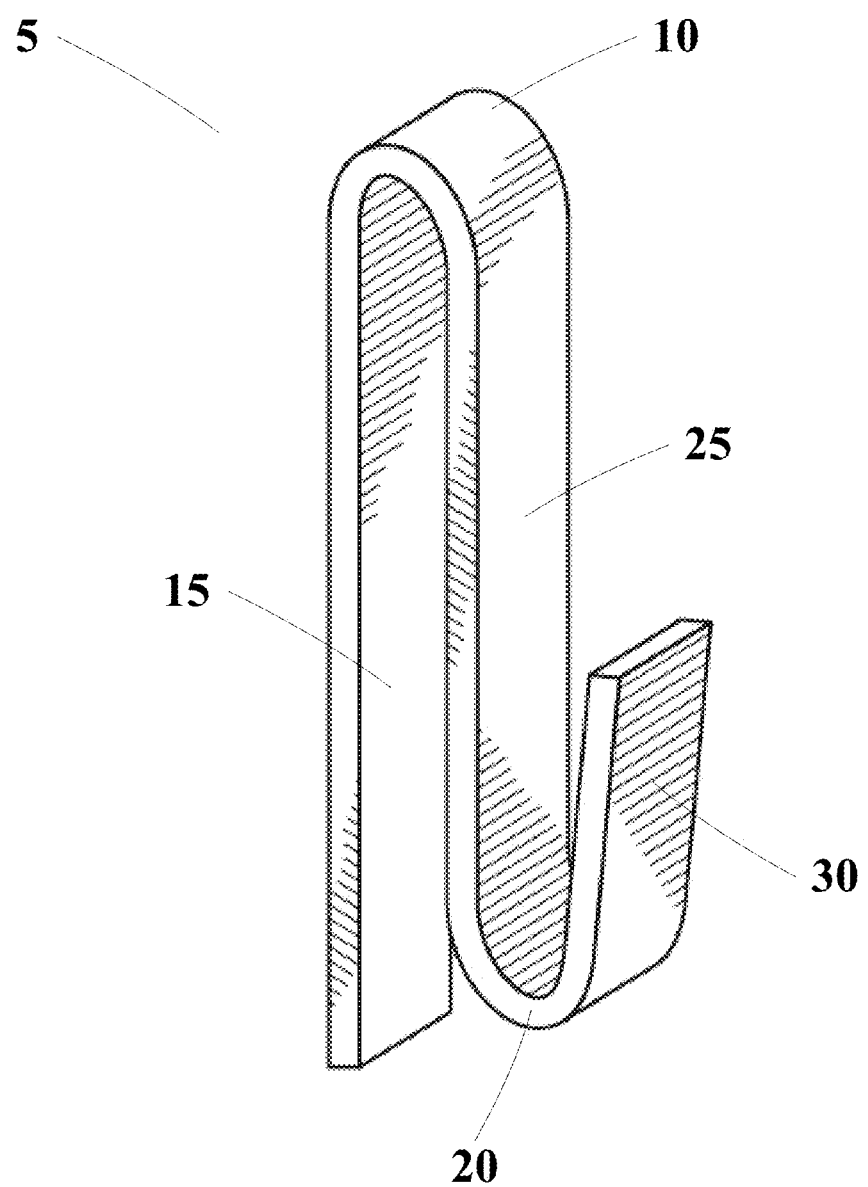
FIG. 1 illustrates an exemplary embodiment of a hook element.

FIG. 1 illustrates an exemplary embodiment of a hook element 5. The hook element may have an upper rest turn 10 that may rest on a bracket arm upper edge 115 of a hanger bracket 100 as well as a rear anchor section 15 that may extend downward from the upper rest turn 10 in abutting relationship with the bracket arm back surface. The rear anchor section 15 may terminate below the upper rest turn 10 in spaced relationship thereto. The hook element 5 may have a lower hook turn 20 spaced below the upper rest turn 10 forward of the hanger arm front surface.

Figure 2:
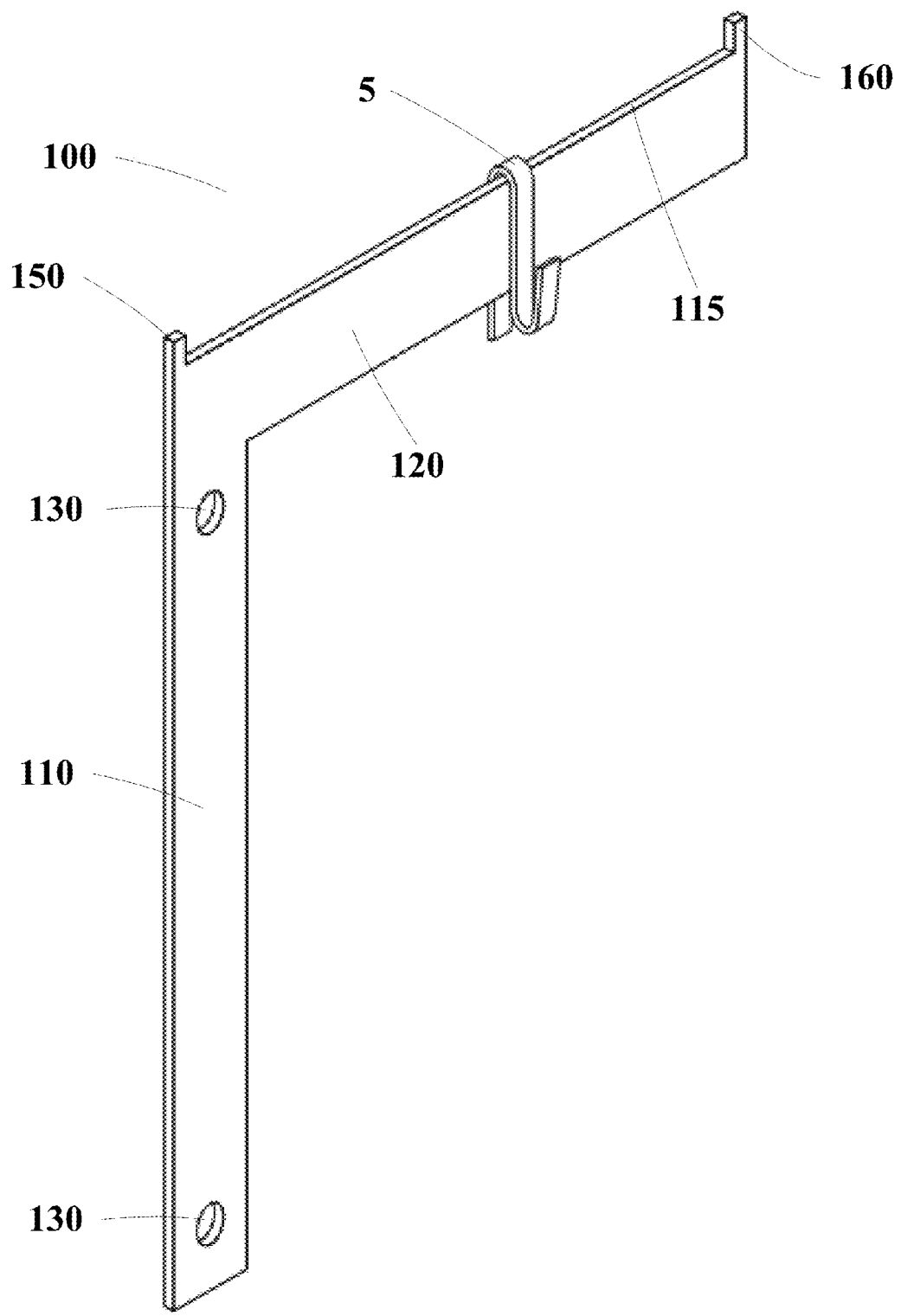
FIG. 2 illustrates an exemplary embodiment of a hanger bracket and hook element.

The hook element 5 may further comprise a central transition section 25 that may extend downward from the upper rest turn 10 to the lower hook turn 20 in abutting relationship with a bracket arm front surface (FIG. 2). The hook element 5 may have a forward hook return 30 extending upward from the lower hook turn 20 in spaced relationship to the central transition section 25. In embodiments, the forward hook return may terminate above the lower hook turn 20 in spaced relationship thereto.

FIG. 2 illustrates an exemplary embodiment of a hanger bracket 100 and hook element 5. The movable hook element 5 may be supported on a hanger bracket arm 120 at a selected location in the horizontal direction. The hanger bracket 100 may comprise a hanger bracket leg 110 including at least two spaced stud fastening points 130 selectably alignable in an abutting relationship with the finished surface at a lateral projection of an identified stud 60.

The hanger bracket 100 may further comprise a hanger bracket arm 120 supported by the hanger bracket leg 110 in fixed relationship thereto. The hanger bracket arm 120 may have a bracket arm back surface disposed in opposition to the finished surface as well as a bracket arm front surface disposed in parallel opposition to the bracket arm back surface. The hanger bracket arm 120 may have a continuous bracket arm upper edge 115 extending in a horizontal direction between the bracket arm back surface and bracket arm front surface.

The hanger bracket arm 120 in the embodiment of FIG. 2 may additionally include first stop 150 positioned on the upper surface of the hanger bracket arm 120, and second stop 160 also positioned on the upper surface of the hanger bracket arm 120. First stop 150 and second stop 160 are displayed apart by a predefined distance.

In embodiments, each of at least two threaded fasteners at their heads thereof may be engageable with the hanger bracket leg 110 at the respective one of the at least two spaced stud fastening points 130 in order to draw the hanger bracket leg 110 against the wallboard layer in an affixed abutting relationship with the finished surface. In embodiments, the at least two threaded fasteners may each have a length greater than thickness of the wallboard layer. In embodiments, each threaded fastener may have threads disposed opposite the head thereof for threaded engagement with an identified stud 60.

In embodiments, the movable hook element 5 may be secured at the selected location on the hanger bracket arm 120 by the rear anchor section 15 being captured in a friction fit between the bracket arm rear surface and the finished surface.

Figure 3:
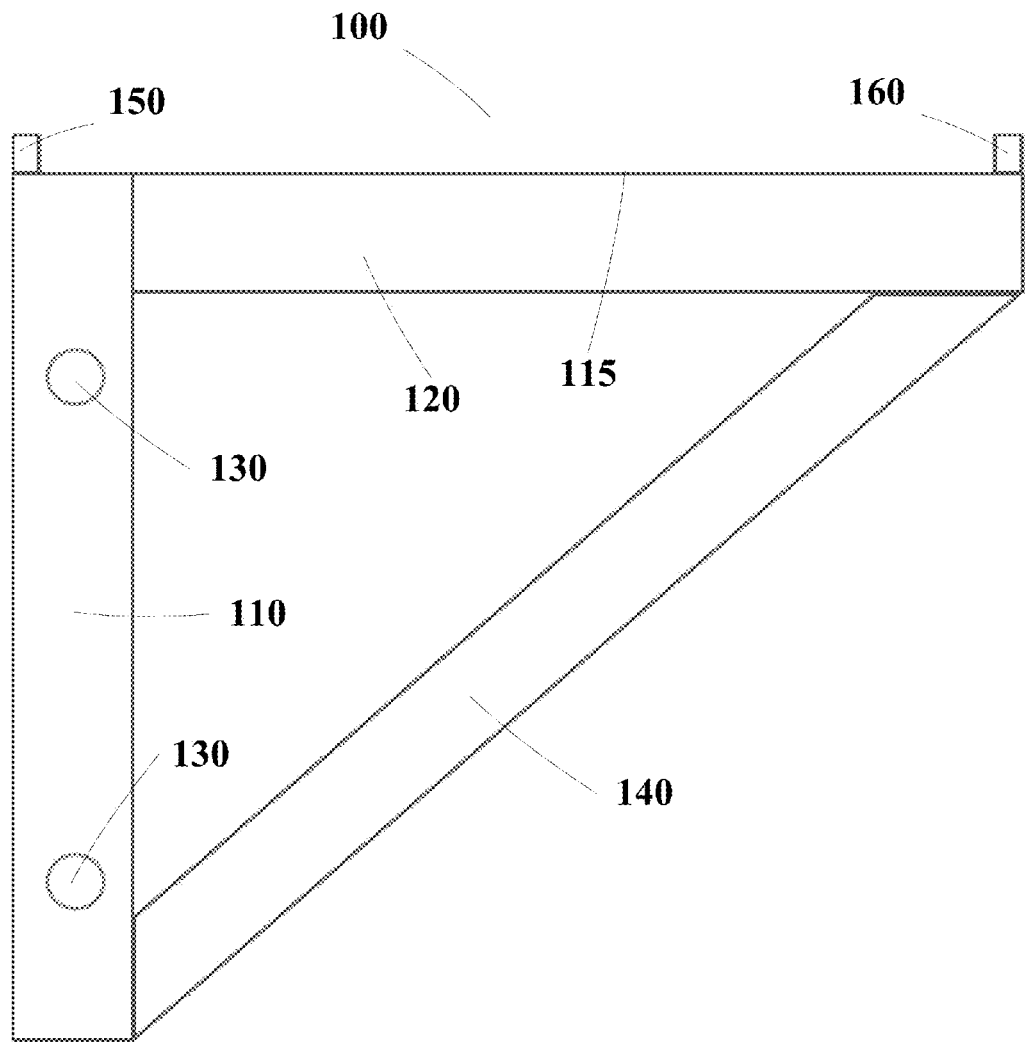
FIG. 3 illustrates an exemplary embodiment of a hanger bracket.

FIG. 3 illustrates a two-dimensional depiction of a right-angle triangle embodiment of the hanger bracket 100 in accordance with embodiments. The embodiment depicted may include hanger bracket leg 110, hanger bracket arm 120, and brace member 140.

As shown, hanger bracket leg 110 has a length and a width, wherein the length is of a greater magnitude than the width defining the length of the embodiment. Further hanger bracket leg 110 defines both an upper end and a lower end. In the configuration shown, the hanger bracket leg 110 may be fixably connected to hanger bracket arm 120 at the upper end. The lower end of the hanger bracket leg 110 may be fixably connected to the brace member 140.

In embodiments, hanger bracket leg 110 may also include one or more apertures 130 displayed along the length.

As shown, hanger bracket arm 120 has a length, and a width wherein the width is of a greater magnitude than the length defining the width of the embodiment. Furthermore, hanger bracket arm 120 may be fixable connected to the hanger bracket leg 110 at a first position, and may be fixable connected to the brace member 140 at a second position.

The hanger bracket arm 120 in the embodiment of FIG. 3 may additionally include first stop 150 positioned on the upper surface of the hanger bracket arm 120, and second stop 160 also positioned on the upper surface of the hanger bracket arm 120. First stop 150 and second stop 160 are displayed apart by a predefined distance.

As shown, brace member 140 may be substantially trapezoidal in shape and fixably connected to both the hanger bracket leg 110 and the hanger bracket arm 120.

In embodiments of the right-angle triangle embodiment of the hanger bracket 100 of FIG. 3, the length of the hanger bracket leg 110 may be 8 inches. In embodiments of the right-angle triangle embodiment of the hanger bracket 100 of FIG. 3, the length of the hanger bracket arm 120 may be 9 inches.

Figure 4:
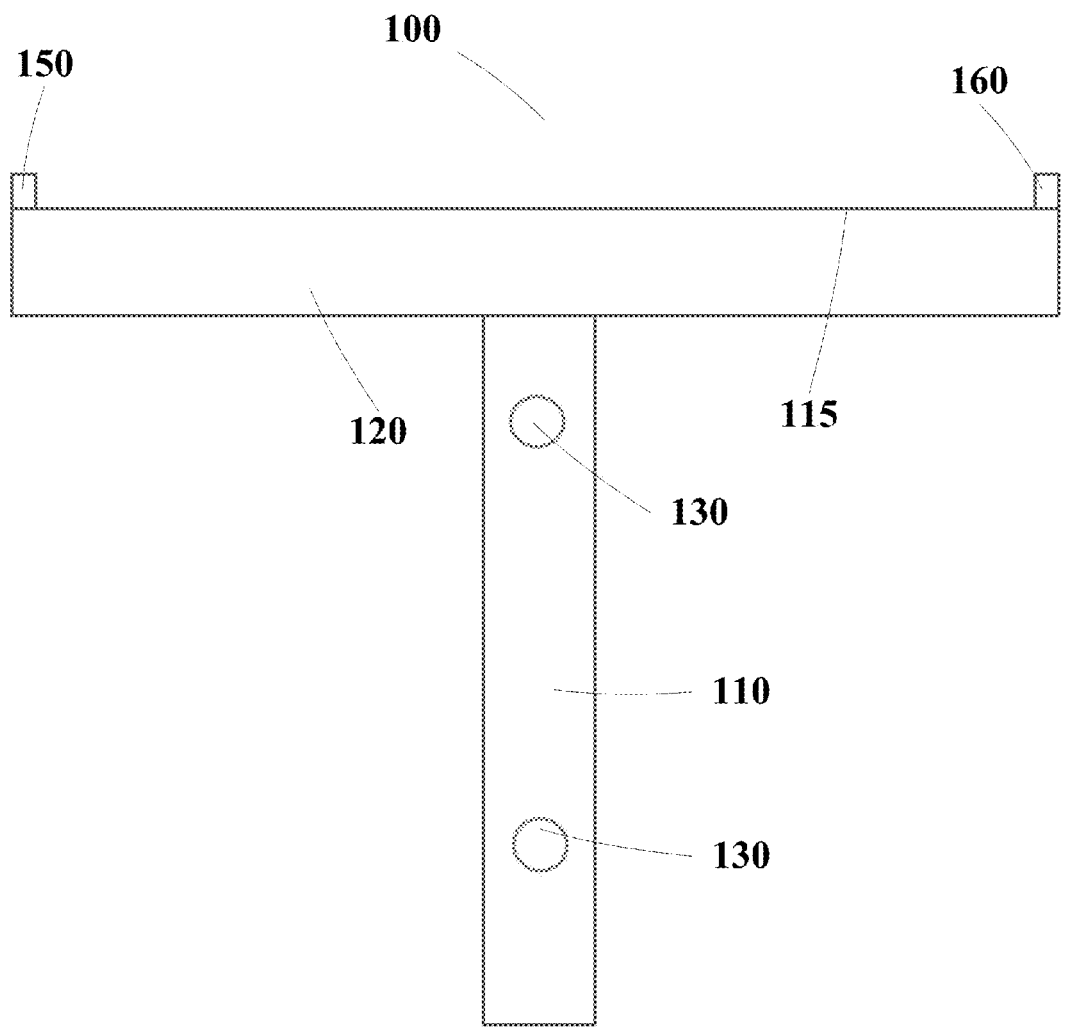
FIG. 4 illustrates an exemplary embodiment of a hanger bracket.

FIG. 4 illustrates a further embodiment of the hanger bracket 100 wherein the hanger bracket leg 110 and the hanger bracket arm 120 may be arranged in a T-Bracket position. As shown in this arrangement the hanger bracket arm 120 may be fixably attached at the middle, or a predefined horizontal distance to the upper most edge of the leg bracket 110.

The hanger bracket arm 120 in the embodiment of FIG. 4 may additionally include first stop 150 positioned on the upper surface of the hanger bracket arm 120, and second stop 160 also positioned on the upper surface of the hanger bracket arm 120. First stop 150 and second stop 160 are displayed apart by a predefined distance.

In embodiments of the T-Bracket embodiment of the hanger bracket 100 of FIG. 4, the length of the hanger bracket leg 110 may be 8 inches. In embodiments of the T-Bracket embodiment of the hanger bracket 100 of FIG. 4, the length of the hanger bracket arm 120 may be 9 inches.

Figure 5:
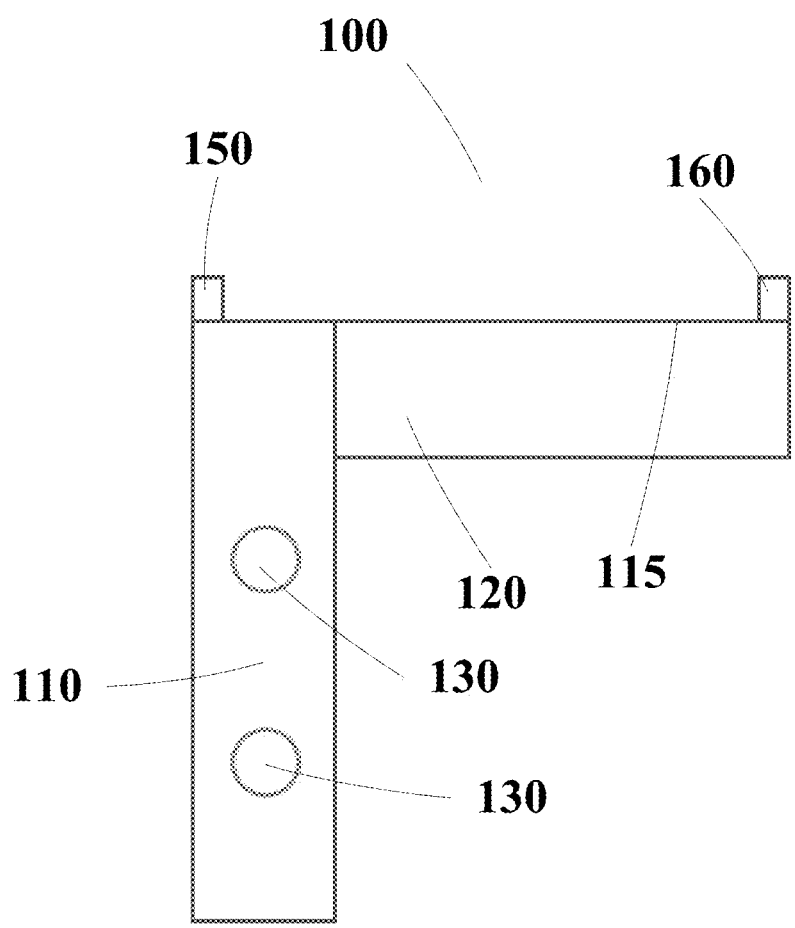
FIG. 5 illustrates an exemplary embodiment of a hanger bracket.

FIG. 5 illustrates an L-Shaped (or small-bracket) embodiment of the hanger bracket 100. As shown, the L-Shaped embodiment includes hanger bracket leg 110 fixably connected to hanger bracket arm 120. In this arrangement, first stop 150 may be positioned on the upper surface of hanger bracket leg 110. Second stop 160 may be located on the upper surface of the hanger bracket arm 120 at the distal end.

In embodiments of the L-Shaped embodiment of the hanger bracket 100 of FIG. 5, the length of the hanger bracket leg 110 may be 4 inches. In embodiments of the L-Shaped embodiment of the hanger bracket 100 of FIG. 5, the length of the hanger bracket arm 120 may be 5 inches.

Figure 6:
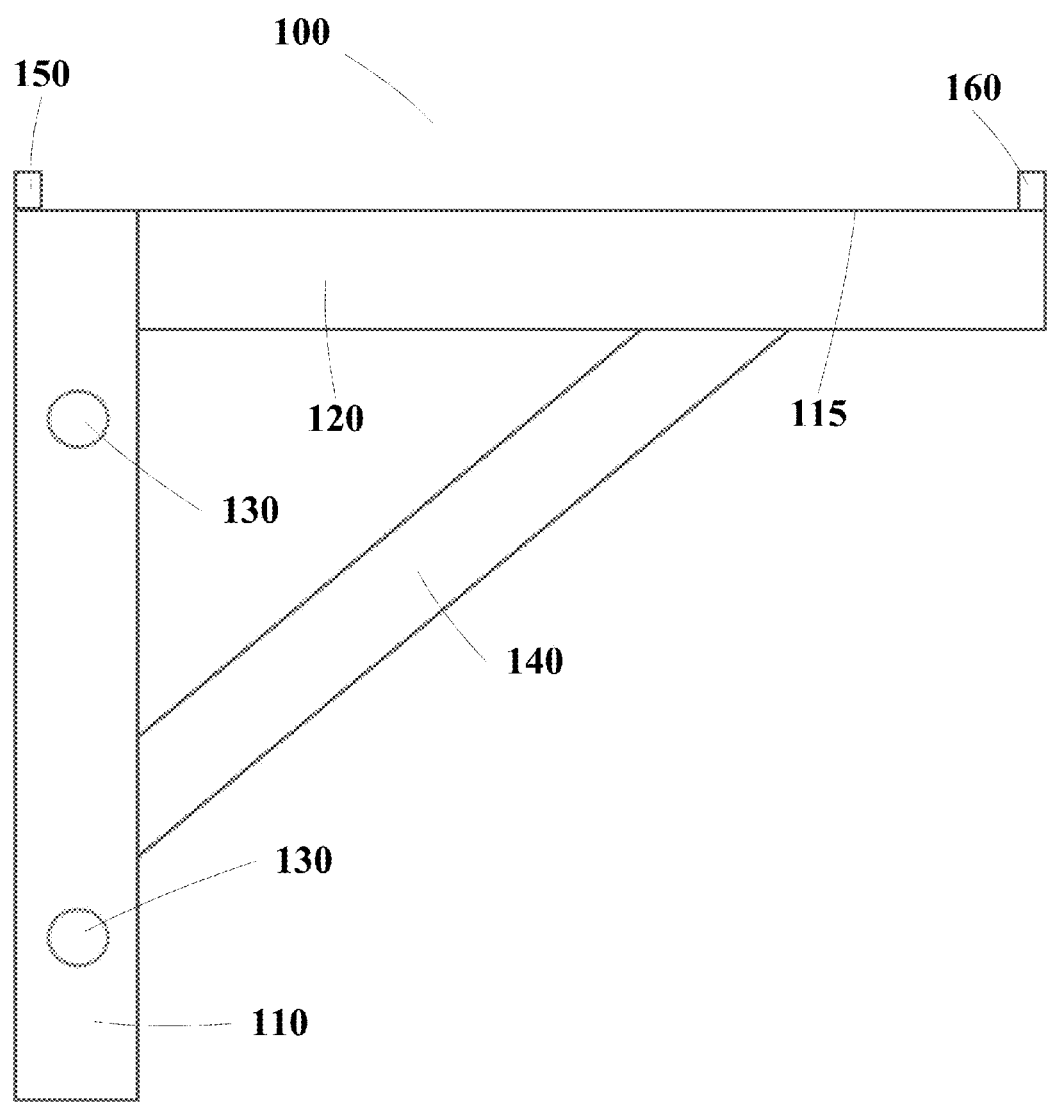
FIG. 6 illustrates an exemplary embodiment of a hanger bracket.

FIG. 6 illustrates a semi-triangular bracket embodiment of the hanger bracket 100. As shown, this arrangement may bear resemblance to the L-Shaped embodiment with the addition of brace member 140 connecting between the hanger bracket leg 110 and the hanger bracket arm 120.

In embodiments of the semi-triangular embodiment of the hanger bracket 100 of FIG. 6, the length of the hanger bracket leg 110 may be 8 inches. In embodiments of the semi-triangular embodiment of the hanger bracket 100 of FIG. 6, the length of the hanger bracket arm 120 may be 9 inches.

Figure 7:
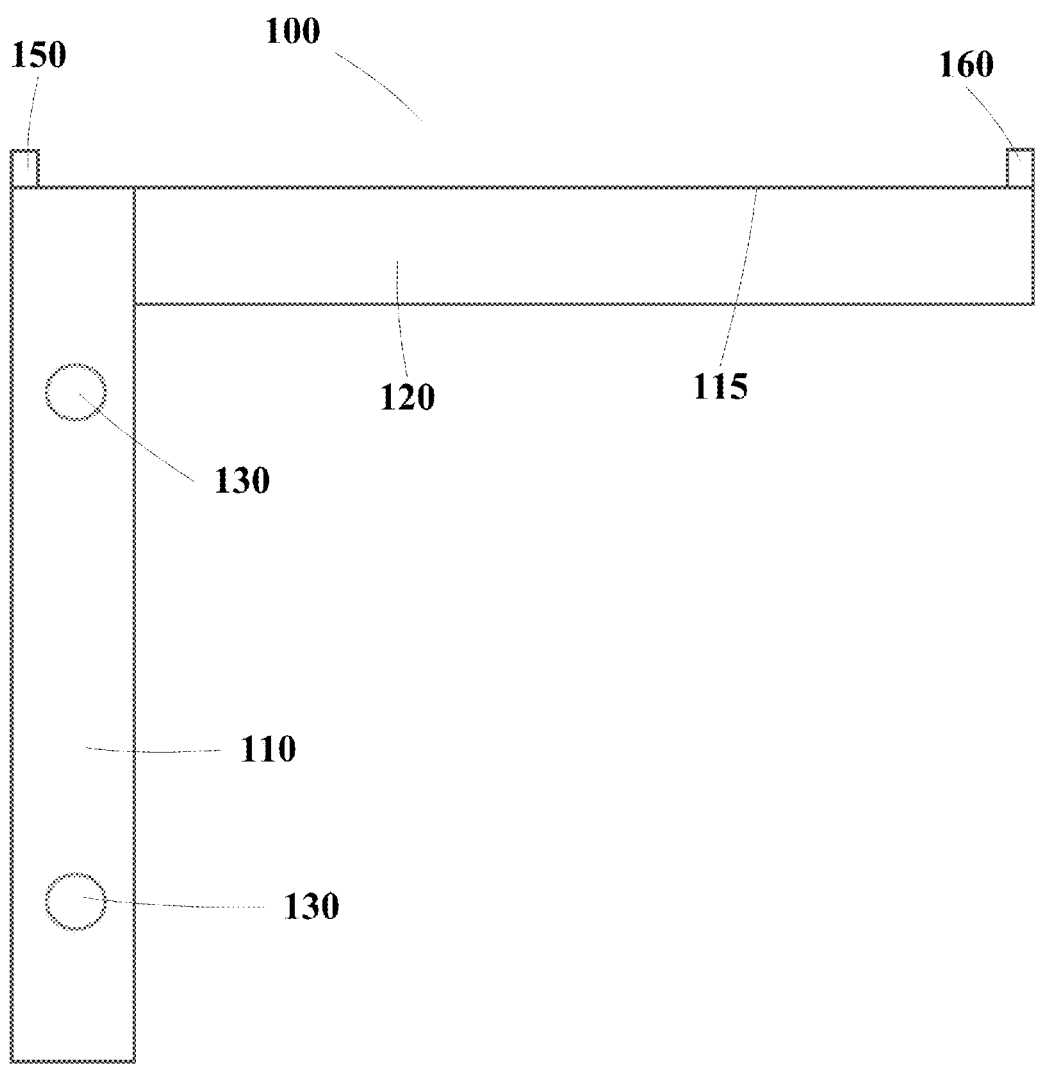
FIG. 7 illustrates an exemplary embodiment of a hanger bracket.

FIG. 7 illustrates a further two dimensional embodiment of the L-Shaped Bracket, which may serve to give an illustrative example of the variance in dimensions. The various members may be configured without departing from the scope of the present disclosure. In embodiments of the further L-Shaped embodiment of the hanger bracket 100 of FIG. 7, the length of the hanger bracket leg 110 may be 8 inches. In embodiments of the further L-Shaped embodiment of the hanger bracket 100 of FIG. 7, the length of the hanger bracket arm 120 may be 9 inches.

In embodiments, first and second stops 150, 160 may be provided as limits to the horizontal movement of the hook element 5. The hook element 5 may be adjusted horizontally on the continuous bracket arm upper edge 115 within the first and second stops 150, 160.

Figure 8:
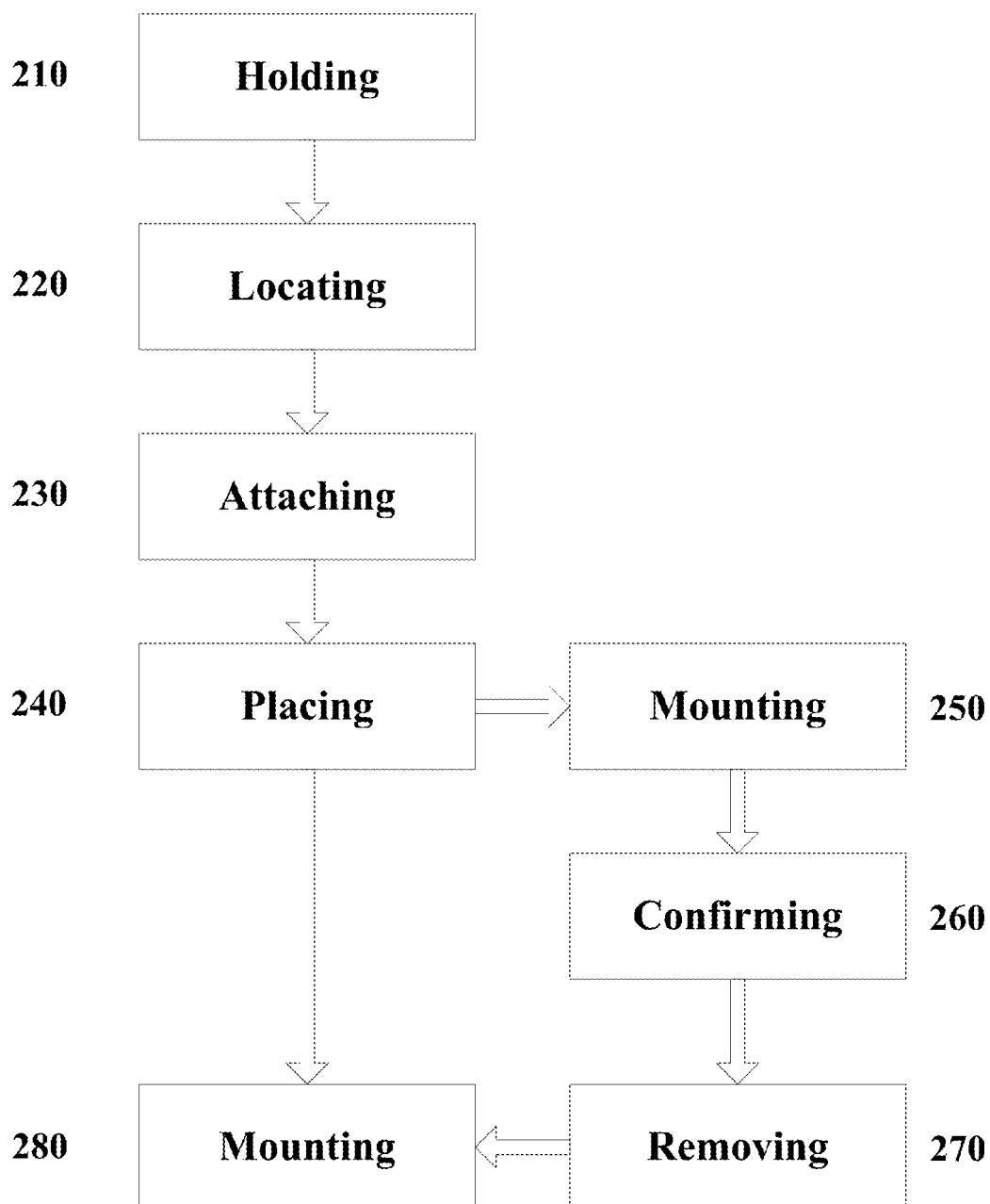
FIG. 8 illustrates a method for placing an object on a wall utilizing the present disclosure in accordance with embodiments.

FIG. 8 illustrates a method 200 for placing an object 40 on a wall 50 utilizing the present disclosure in accordance with embodiments. Method 200 may include holding 210 an object 40 to a surface and determining the center point 45 of the object (such as a picture frame being held up to a wall 50). Method 200 may further include locating 220 a proximate stud 60 using a stud finder. Method 200 may further include attaching 230 a hanger bracket 100 to a stud 60 using screws or a similar attachment means. Method 200 may further include placing 240 a movable hook element 5 on the hanger bracket 100. Method 200 may further include mounting 280 the object 40 to the hanger bracket 100.

Alternatively, method 200 may include (after placing 240) mounting the object 40 on the hanger bracket 100 and confirming 260 the position of the movable hook element 5. Method 200 may further include removing 270 the object 40 and fastening the screws (or other attachment means) tightly. The mounting 280 may then take place.

Figure 9:
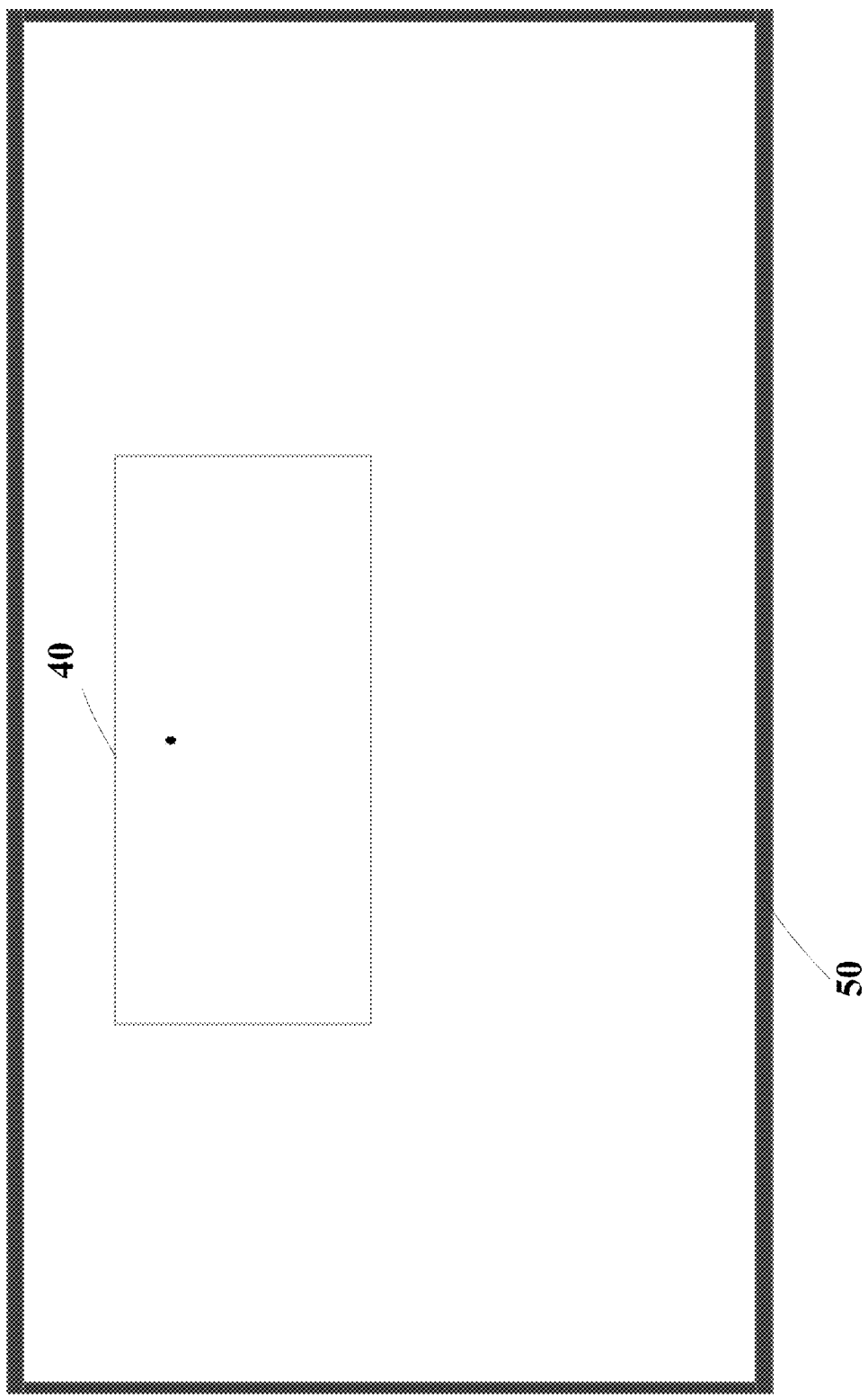
FIG. 9 presents a visual representation of step 210 with a surface of a wall shown in accordance with embodiments.
Figure 10:
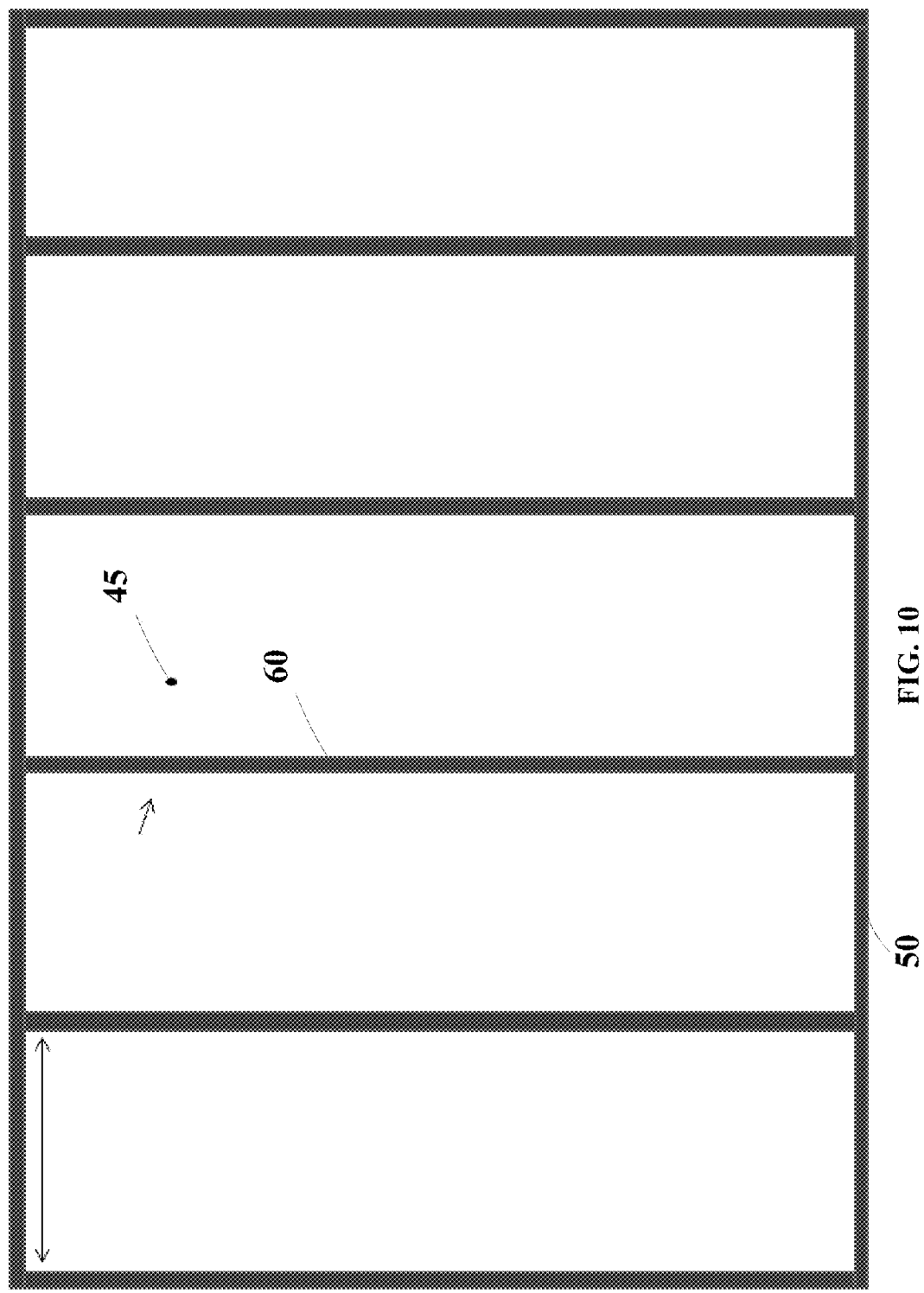
FIG. 10 presents a visual representation of Step 220 with a transparent surface of a wall and underlying stud wall structure in accordance with embodiments.

FIG. 9 presents a visual representation of step 210 with a surface of a wall 50 as shown in accordance with embodiments. Commencing at step 210, the object 40 intended to be affixed to the wall 50 may be held in association with the wall 50 to determine an approximate center point 45. Continuing to step 220 (FIG. 10), which may include locating a proximate stud 60 to the center point 45. It is expected that the determination of a proximate stud 60 will be performed through use of a stud finder. However, other methods of locating a stud may be performed without departing from the present disclosure.

Figure 11:
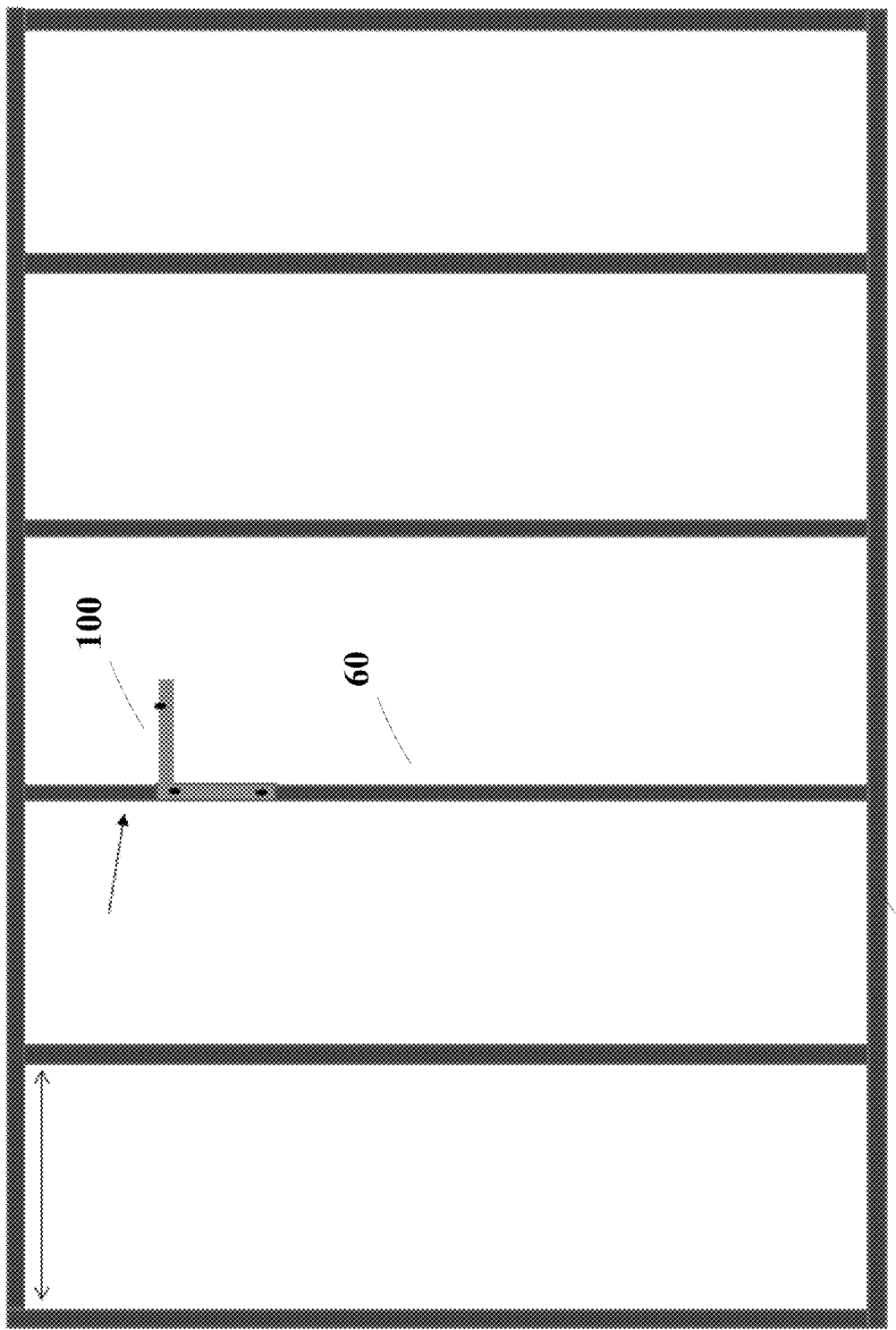
FIG. 11 presents a visual representation of Step 230 with a transparent wall surface and underlying stud wall structure in accordance with embodiments.

Continuing to step 230 (FIG. 11), the hanger bracket 100 may be affixed to a wall 50 by connections placed through apertures 130 in the hanger bracket leg 110. Embodiments of the present disclosure may typically employ screws, however, other connection methods, e.g. nails, etc. may be employed.

Figure 12:
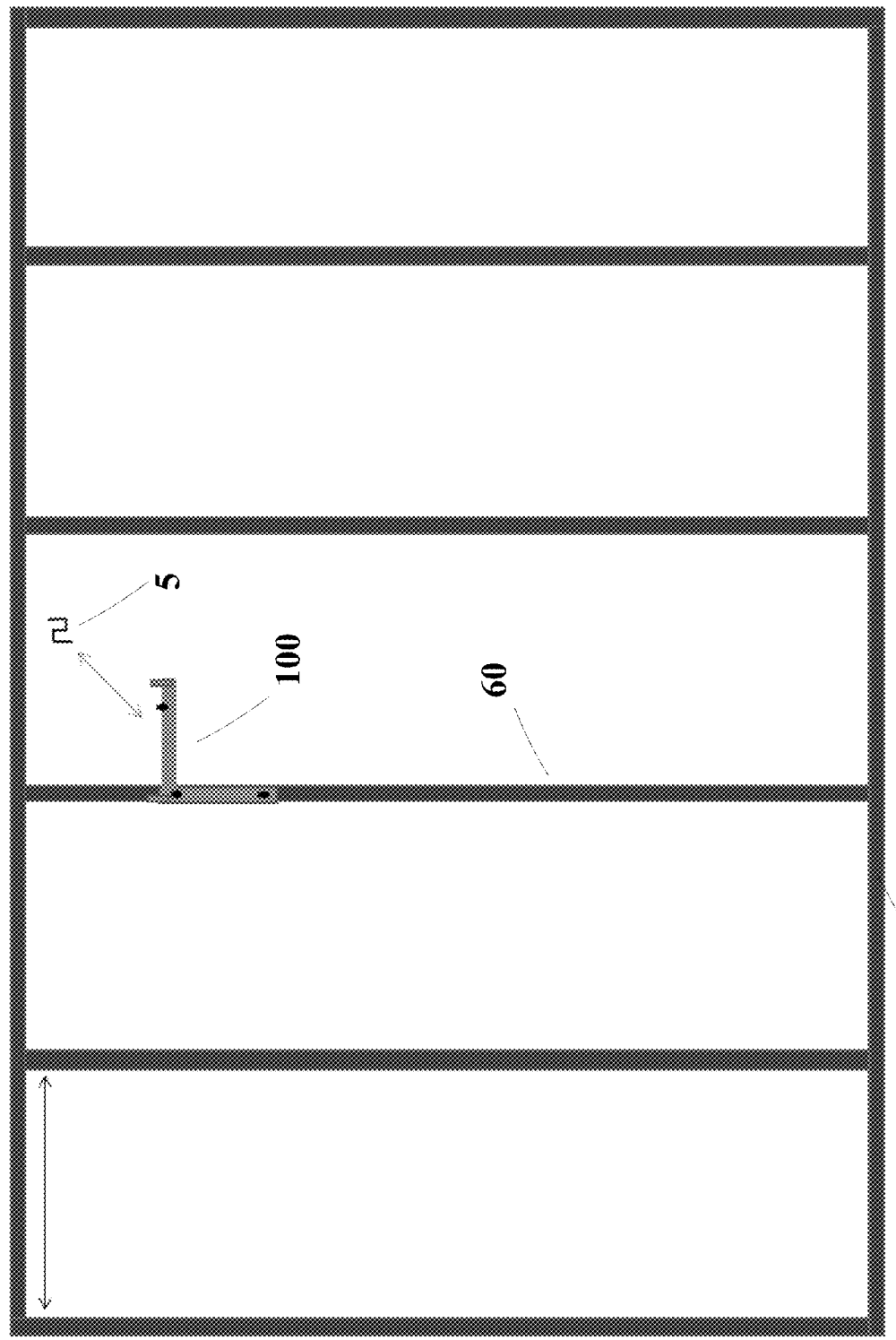
FIG. 12 presents a visual representation of Step 240 with a transparent wall surface and underlying stud wall structure in accordance with embodiments.

Continuing to step 240 (FIG. 12), a movable hook element 5 may be placed on hanger bracket arm 120.

Figure 13:
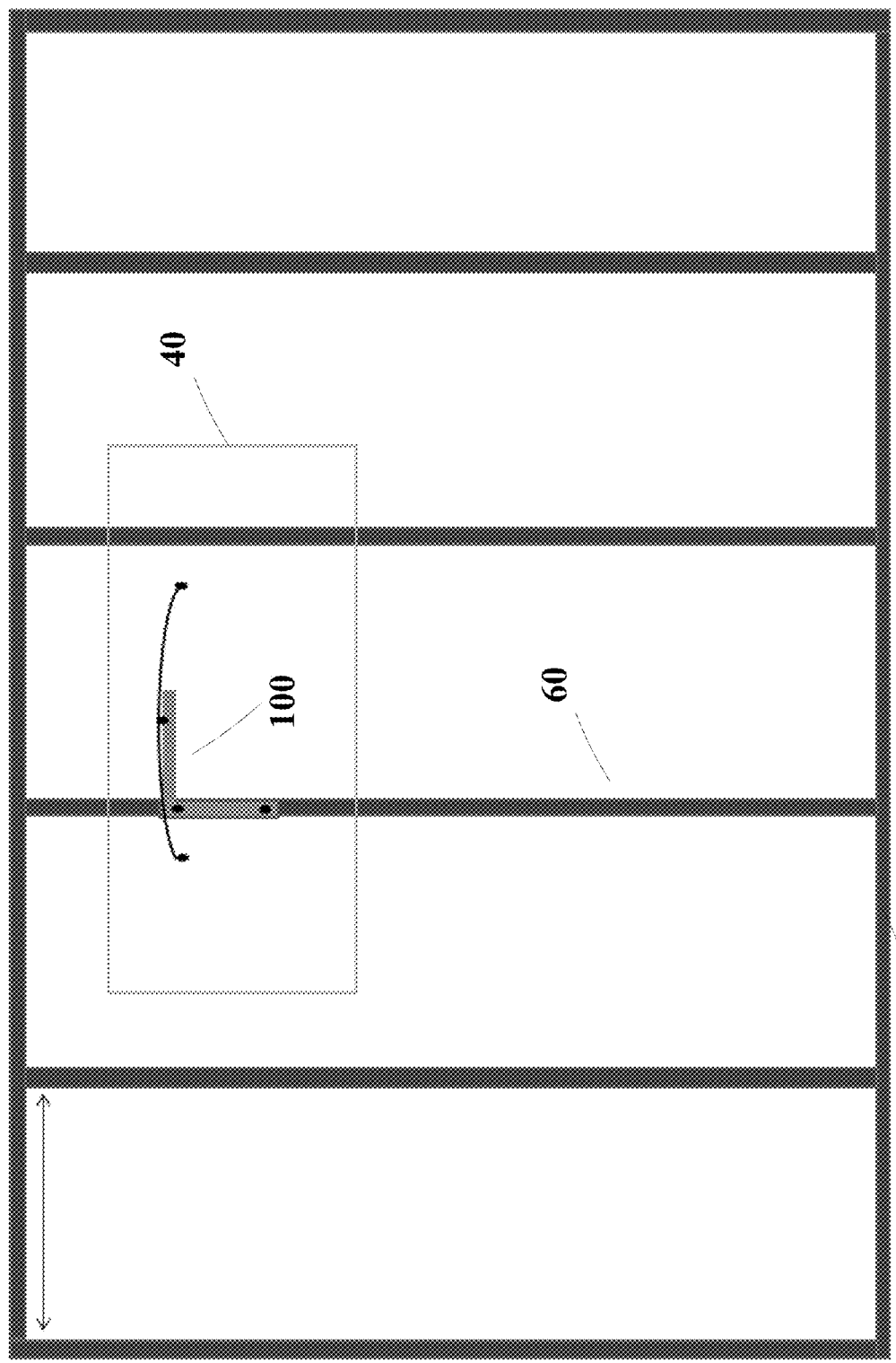
FIG. 13 presents a visual representation of Step 250 and Step 260 with a transparent wall surface and underlying stud wall structure in accordance with embodiments.

At step 250 and 260 (FIG. 13), object 40 may be mounted to the movable hook element 5 and the position may be confirmed by shifting the movable hook element 5 along hanger bracket arm 120. Embodiments may employ stops 150, 160 along the upper surface of the hanger bracket 100 to limit movement of the movable hook element 5.

Figure 14:
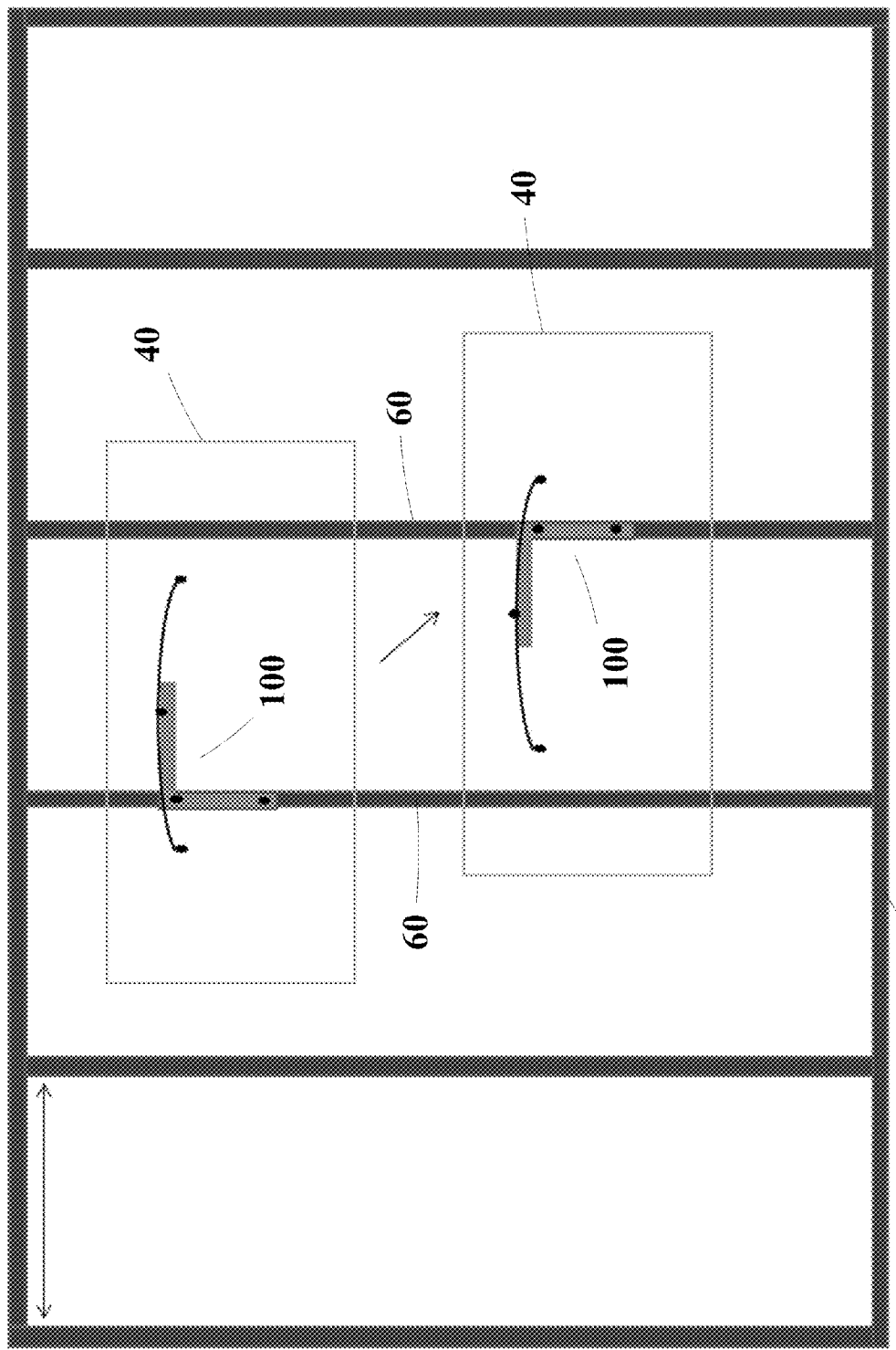
FIG. 14 presents a visual representation of Step 270 and Step 280 with a transparent wall surface and underlying stud wall structure in accordance with embodiments.

Steps 270 and 280 (FIG. 14) may be employable by the present disclosure. In the event that connection through apertures 130 were not completed, step 260 may be employed which may be to remove the object 40 and tighten the connections for final fixing of the object 40. Step 270 may include mounting the object 40. In the case of FIG. 14, the final position of the object 40 was changed, so the object 40, as well as the hanger bracket 100, has been moved to an alternative position.

Figure 15:
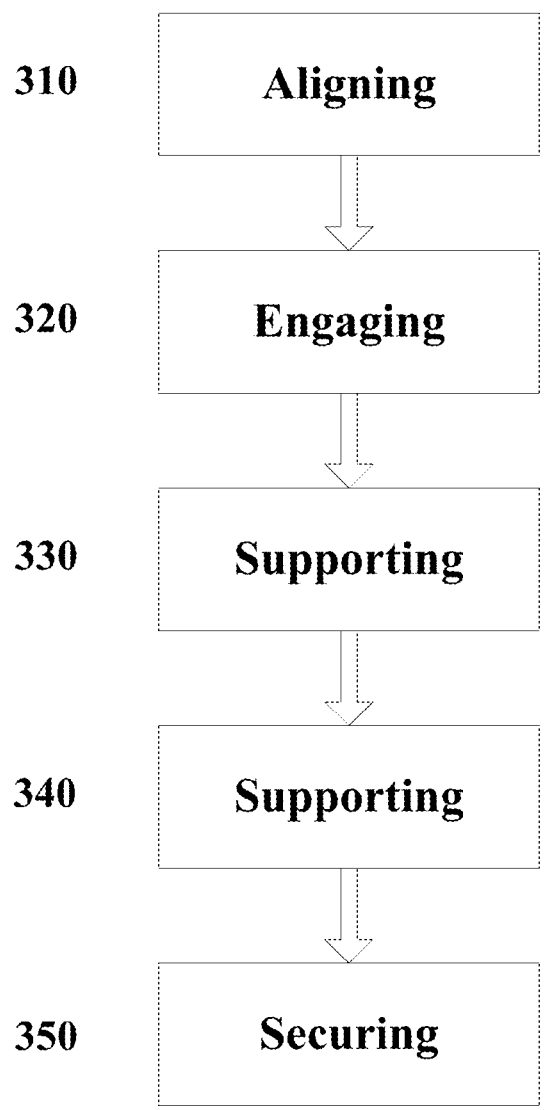
FIG. 15 displays an alternative method 300 employing the present disclosure in accordance with embodiments.

FIG. 15 displays an alternative method 300 for affixing an object 40 to a wallboard layer of a stud-wall 50 of a building employing the present disclosure in accordance with embodiments.

Method 300 may comprise selectably aligning 310, in an abutting relationship, a hanger bracket leg 110 including at least two spaced stud fastening points 130 with a finished surface of the wallboard layer at a lateral projection of an identified stud 60.

Method 300 may further comprise engaging 320 at least two threaded fasteners. In embodiments, each of the threaded fasteners may have a length greater than the thickness of the wallboard layer. In embodiments, each threaded fastener may have threads disposed opposite a head thereof for threaded engagement with the identified stud 60. Each threaded fastener at the head thereof may be engageable with the hanger bracket leg 110 at a respective one of said at least two spaced stud fastening points 130 in order to draw the hangar bracket leg 110 against the wallboard layer in an affixed abutting relationship with the finished surface.

Method 300 may further include supporting 330 a hanger bracket arm 120 by the hangar bracket leg 110 in fixed relationship thereto. In embodiments, the hanger bracket arm 120 may have a bracket arm back surface disposed in opposition to the finished surface. The hanger bracket arm 120 may have a bracket arm front surface disposed in parallel opposition to the bracket arm back surface. The hanger bracket arm 120 may have a continuous bracket arm upper edge 115 extending in a horizontal direction between the bracket arm back surface and the bracket arm front surface.

Method 300 may further comprise supporting 340 a movable hook element 5 on the hanger bracket arm 120 at a selected location in the horizontal direction. The hook element may have an upper rest turn 10 to rest on the bracket arm upper edge 115. The hook element 5 may have a rear anchor section 15 extending downward from the upper rest turn 10 in abutting relationship with the bracket arm back surface. In embodiments, the rear anchor section 15 may terminate below the upper rest turn 10 in spaced relationship thereto.

In embodiments, the hook element 5 may have a lower hook turn 20 spaced below the upper rest turn 10 forward of the hanger arm front surface. The hook element 5 may have a central transition section 25 extending downward from the upper rest turn 10 to the lower hook turn 20 in abutting relationship with the bracket arm front surface. The hook element 5 may have a forward hook return 30 extending upward from the lower hook turn 20 in spaced relationship to the central transition section 25. In embodiments, the forward hook return 30 may terminate above the lower hook turn 20 in spaced relationship thereto.

Method 300 may further comprise securing 350 the movable hook element 5 at the selected location on the hanger bracket arm 120 by the rear anchor section 15 being captured in a friction fit between the bracket arm rear surface and the finished surface.

The disclosure may provide a hanger system for hanging an object on a stud 60 within a wall 50 of a building. The system may comprise a stud-wall having a wallboard layer affixed to a plurality of studs 60. In embodiments, the wallboard layer may have a finished surface spaced from a rear surface. The plurality of studs 60 may be elongated structural members in parallel extending in a vertical direction relative to a floor. The plurality of studs 60 may be spaced apart in aligned regular relationship along the rear surface of the wallboard layer in order to support the wallboard layer affixed thereto.

The system may further comprise a hanger bracket leg 110 including at least two spaced stud fastening points 130 selectably alignable in an abutting relationship with the finished surface at a lateral projection of an identified stud 60.

The system may further comprise at least two threaded fasteners each having a length greater than thickness of the wallboard layer. In embodiments, each threaded fastener may have threads disposed opposite a head thereof for threaded engagement with an identified stud 60. Each threaded fastener at the head thereof may be engageable with the hanger bracket leg 110 at a respective one of the at least two spaced stud fastening points 130 in order to draw the hangar bracket leg 110 against the wallboard layer in an affixed abutting relationship with the finished surface.

The system may further comprise a hanger bracket arm 120 supported by said hanger bracket leg 110 in fixed relationship thereto. The hanger bracket arm 120 may have a bracket arm back surface disposed in opposition to the finished surface as well as a bracket arm front surface disposed in parallel opposition to the bracket arm back surface. The hanger bracket arm 120 may have a continuous bracket arm upper edge 115 extending in a horizontal direction between the bracket arm back surface and bracket arm front surface.

The system may further comprise a movable hook element 5 that may be supported on the hanger bracket arm 120 at a selected location in the horizontal direction. The hook element 5 may have an upper rest turn 10 to rest on the bracket arm upper edge 115 as well as a rear anchor section 15 extending downward from the upper rest turn 10 in abutting relationship with the bracket arm back surface. The rear anchor section 15 may terminate below the upper rest turn 10 in spaced relationship thereto. The hook element 5 may have a lower hook turn 20 spaced below the upper rest turn 10 forward of the hanger arm front surface.

The hook element 5 may further comprise a central transition section 25 that may extend downward from the upper rest turn 10 to the lower hook turn 20 in abutting relationship with the bracket arm front surface. The hook element 5 may have a forward hook return 30 extending upward from the lower hook turn 20 in spaced relationship to the central transition section 25. In embodiments, the forward hook return 30 may terminate above the lower hook turn 20 in spaced relationship thereto.

In embodiments, the movable hook element 5 may be secured at the selected location on the hanger bracket arm 120 by the rear anchor section 15 being captured in a friction fit between the bracket arm rear surface and the finished surface.

In embodiments, the system may further comprise a brace member 140 supported by the hanger bracket arm 120 and the hanger bracket leg 110 in fixed relationship thereto. The brace member 140 may have a brace member back surface disposed in opposition to the finished surface and a brace member front surface that may be disposed in parallel opposition to the brace member back surface.

The disclosure may further provide an alternative system. The system may comprise a hanger bracket arm 120 and a hanger bracket leg 110 in fixed relationship. The hanger bracket arm 120 and hanger bracket leg 110 may each comprise a front surface and a rear surface. The hanger bracket arm and the hanger bracket leg may be formed as a single unit.

In embodiments, at least a portion of the rear surface of the hanger bracket arm 120 may be coextensive with at least a portion of the rear surface of the hanger bracket leg 110. In embodiments, at least a portion of the front surface of the hanger bracket arm 120 may be coextensive with at least a portion of the front surface of the hanger bracket leg 110. The hanger bracket arm upper edge 115 may comprise a first stop 150 at a distal end and a second stop 160 at a proximal end.

In embodiments, the connection between the hanger bracket arm 120 and the hanger bracket leg 110 may provide force urging the rear surface of the hanger bracket arm 120 against a finished surface of a wallboard layer in order to provide friction fits between a rear anchor section 15 of a hook element 5 and the rear surface of the hanger bracket arm 120 and also between the rear anchor section 15 of the hook element 5 and the finished surface.

In embodiments, the first stop 150 and second stop 160 may be integrated as a single piece with the hanger bracket arm 120. In embodiments, the first stop 150 and second stop 160 may be separate pieces affixed to the hanger bracket arm via means such as, but not limited to welding and male-female engagement.

In embodiments, the hanger bracket 100 may be utilized in conjunction with a level. The level may be able to be positioned adjacent the bracket arm upper edge 115 or below the hanger bracket arm 120 when the hanger bracket arm 120 is being positioned on a wall. In embodiments, a level may be affixed to at least one of the bracket arm upper edge 115 and the hanger bracket arm 120 via means such as, but not limited to welding and male-female engagement.

In embodiments, the hanger bracket 100 may include a level incorporated within the body of the hanger bracket 100, including at least one of the hanger bracket leg 110 and the hanger bracket arm 120. A portion of the body of the hanger bracket 100 may be removed to provide an orifice for the level to be placed. The level may comprise a rubber housing that may cover the edges of the level. The rubber housing may further comprise a front edge extension portion and a back edge extension portion that may circumnavigate the periphery of the front edge and the back edge of the rubber housing. In order to fit the level into the orifice, the level and rubber housing may be pressed into the hole so that the front edge extension portion and the back edge extension portion are both positioned adjacent the front and back surfaces of the hanger bracket 100 and not adjacent the interior edge of the orifice.

For the purposes of this disclosure, the terms "hook element" and "movable hook element" may be synonymous.

For the purposes of this disclosure, the terms "bracket leg" and "hanger bracket leg" may be synonymous.

For the purposes of this disclosure, the terms "bracket arm" and "hanger bracket arm" may be synonymous.

For the purposes of this disclosure, the terms "stud", "proximate stud", and "identified stud" may be synonymous.

For the purposes of this disclosure, the terms "stud" and "stud-wall" may be synonymous.

For the purposes of this disclosure, the term "stud-wall" may refer to a wall including a frame with at least one stud.

What is claimed is:

1. A hanger system hanging an object on a stud-wall of a building, said system comprising:

the stud-wall, the stud wall having a wallboard layer affixed to a plurality of studs, the wallboard layer having a finished surface spaced from a rear surface, the plurality of studs being elongated structural members in parallel extending in a vertical direction relative to a floor, the plurality of studs spaced apart in aligned regular relationship along the rear surface of the wallboard layer to support the wallboard layer affixed thereto;

a hanger bracket leg including at least two spaced stud fastening points selectably alignable in an abutting relationship with the finished surface at a lateral projection of an identified stud;

at least two threaded fasteners, each threaded fastener having a length greater than thickness of the wallboard layer, each threaded fastener having threads disposed opposite a head thereof for threaded engagement with the identified stud, each threaded fastener at the head thereof engageable with the hanger bracket leg at a respective one of said at least two spaced stud fastening points to draw the hangar bracket leg against the wallboard layer in an affixed abutting relationship with the finished surface;

a hanger bracket arm supported by said hangar bracket leg in fixed relationship thereto, said hanger bracket arm having a bracket arm back surface disposed in opposition to the finished surface, said hanger bracket arm having a bracket arm front surface disposed in parallel opposition to the bracket arm back surface, said hanger bracket arm having a continuous bracket arm upper edge extending in a horizontal direction between the bracket arm back surface and bracket arm front surface; and a movable hook element to be supported on said hanger bracket arm at a selected location in the horizontal direction, said hook element having an upper rest turn to rest on the bracket arm upper edge, said hook element having a rear anchor section extending downward from the upper rest turn in abutting relationship with the bracket arm back surface, the rear anchor section terminating below the upper rest turn in spaced relationship thereto, said hook element having a lower hook turn spaced below the upper rest turn forward of the hanger arm front surface, said hook element having a central transition section extending downward from the upper rest turn to the lower hook turn in abutting relationship with the bracket arm front surface, said hook element having a forward hook return extending upward from the lower hook turn in spaced relationship to the central transition section, the forward hook return terminating above the lower hook turn in spaced relationship thereto;

wherein the movable hook element is secured at the selected location on the hanger bracket arm by the rear anchor section being captured in a friction fit between the bracket arm rear surface and the finished surface.

2. The system of claim 1, additionally comprising:

a brace member supported by said hangar bracket arm and said hanger bracket leg in fixed relationship thereto, said brace member having a brace member back surface disposed in opposition to the finished surface, said brace member having a brace member front surface disposed in parallel opposition to the brace member back surface.

3. The system of claim 1, the hanger bracket leg and hanger bracket arm configured in a T-bracket arrangement.

4. The system of claim 1, configured in a triangular-bracket arrangement.

5. The system of claim 1, configured in an L-Shaped bracket arrangement.

6. A method for affixing an object to a wallboard layer of a stud-wall of a building, the method comprising:

selectably aligning in an abutting relationship a hanger bracket leg including at least two spaced stud fastening points with a finished surface of the wallboard layer at a lateral projection of an identified stud;

engaging at least two threaded fasteners, each threaded fastener having a length greater than thickness of the wallboard layer, each threaded fastener having threads disposed opposite a head thereof for threaded engagement with the identified stud, each threaded fastener at the head thereof engageable with the hanger bracket leg at a respective one of said at least two spaced stud fastening points to draw the hangar bracket leg against the wallboard layer in an affixed abutting relationship with the finished surface;

supporting a hanger bracket arm by said hangar bracket leg in fixed relationship thereto, said hanger bracket arm having a bracket arm back surface disposed in opposition to the finished surface, said hanger bracket arm having a bracket arm front surface disposed in parallel opposition to the bracket arm back surface, said hanger bracket arm having a continuous bracket arm upper edge extending in a horizontal direction between the bracket arm back surface and bracket arm front surface; and supporting a movable hook element on said hanger bracket arm at a selected location in the horizontal direction, said hook element having an upper rest turn to rest on the bracket arm upper edge, said hook element having a rear anchor section extending downward from the upper rest turn in abutting relationship with the bracket arm back surface, the rear anchor section terminating below the upper rest turn in spaced relationship thereto, said hook element having a lower hook turn spaced below the upper rest turn forward of the hanger arm front surface, said hook element having a central transition section extending downward from the upper rest turn to the lower hook turn in abutting relationship with the bracket arm front surface, said hook element having a forward hook return extending upward from the lower hook turn in spaced relationship to the central transition section, the forward hook return terminating above the lower hook turn in spaced relationship thereto;

securing the movable hook element at the selected location on the hanger bracket arm by the rear anchor section being captured in a friction fit between the bracket arm rear surface and finished surface.

* * * * *